US007304571B2

(12) United States Patent
Halsey et al.

(10) Patent No.: US 7,304,571 B2
(45) Date of Patent: Dec. 4, 2007

(54) FIREFIGHTER LOCATOR WITH ACTIVATOR

(75) Inventors: J. Doss Halsey, Falls Church, VA (US); Douglas J. Wolff, New Windsor, MD (US)

(73) Assignee: Information Systems Laboratories, Inc., San Diego, CA (US)

( * ) Notice: Subject to any disclaimer, the term of this patent is extended or adjusted under 35 U.S.C. 154(b) by 1050 days.

(21) Appl. No.: 10/371,629

(22) Filed: Feb. 19, 2003

(65) Prior Publication Data

US 2003/0152061 A1 Aug. 14, 2003

Related U.S. Application Data

(63) Continuation-in-part of application No. 09/691,751, filed on Oct. 18, 2000, now Pat. No. 6,965,344.

(51) Int. Cl.
*A62B 29/00* (2006.01)
*A62B 37/00* (2006.01)
*F24F 13/00* (2006.01)
*H04B 1/034* (2006.01)
*G08B 5/22* (2006.01)

(52) U.S. Cl. .......................... 340/539.13; 340/825.36; 455/100; 128/201.28

(58) Field of Classification Search .............................. 340/825.7–825.73, 7.1–7.63, 10.1–10.52, 340/146.2, 500, 539.32, 573.1, 626, 686.1–686.6, 340/3.1, 825.69, 825.49, 825.36–825.43; 455/100; 128/200.29–201.19
See application file for complete search history.

(56) References Cited

U.S. PATENT DOCUMENTS 4,285,339 A * 8/1981 McIntyre ............... 128/204.23
4,728,959 A * 3/1988 Maloney et al. ............ 342/457
5,327,144 A * 7/1994 Stilp et al. .................. 342/387
5,492,110 A * 2/1996 Lenz et al. ............ 128/202.22
5,534,876 A * 7/1996 Erickson et al. ............ 342/387
5,583,517 A * 12/1996 Yokev et al. ............... 342/457
5,596,330 A * 1/1997 Yokev et al. ............... 342/387
5,664,006 A * 9/1997 Monte et al. ............... 455/405
5,781,118 A * 7/1998 Wise et al. ................. 340/632
5,790,076 A * 8/1998 Sypniewski ................. 342/365

(Continued)

OTHER PUBLICATIONS

Matthew S. Reynolds; A Phase Measurement Radio Positioning System for Indoor Use; Thesis; Massachusetts Institute of Technology; Jul. 15, 1999.*

*Primary Examiner*—Benjamin C. Lee
*Assistant Examiner*—Jennifer Mehmood
(74) *Attorney, Agent, or Firm*—Nydegger and Associates

(57) ABSTRACT

A device for activating a signal emitter for use in a firefighter locator system operates in conjunction with the firefighter's self-contained breathing apparatus (SCBA). The activation device includes a pressure sensor to monitor pressure on an air line that delivers air from the SCBA air tank to the SCBA air regulator. When the firefighter opens the SCBA air tank valve, pressure is sensed in the air line and the emitter is activated to transmit a signal. The signal is received by base stations that then use the signal to locate/track the signal emitter. Preferably, the activating system also includes a user operated reset button(s) and a shutoff circuit to allow the user to stop transmission of the signal by the signal emitter. The shutoff circuit is designed to stop transmission of the signal only after the air line has been depressurized and the reset button(s) is depressed.

18 Claims, 3 Drawing Sheets

U.S. PATENT DOCUMENTS

| | | | | |
|---|---|---|---|---|
| 5,999,131 | A * | 12/1999 | Sullivan | 342/465 |
| 6,091,331 | A * | 7/2000 | Toft et al. | 340/539.11 |
| 6,121,881 | A * | 9/2000 | Bieback et al. | 340/573.1 |
| 6,239,748 | B1 * | 5/2001 | Gilhousen | 342/442 |
| 2002/0008625 | A1 * | 1/2002 | Adams et al. | 340/573.1 |
| 2004/0000311 | A1 * | 1/2004 | Lowry | 128/204.26 |

* cited by examiner

FIREFIGHTER LOCATOR WITH ACTIVATOR

This application is a continuation-in-part of application Ser. No. 09/691,751 filed Oct. 18, 2000 now U.S. Pat. No. 6,965,344, which is currently pending. The contents of application Ser. No. 09/691,751 are incorporated herein by reference.

FIELD OF THE INVENTION

The present invention pertains generally to systems for locating and tracking moving objects such as the position of a person inside a structure. More particularly, the present invention pertains to activation devices for signal emitters that are useful as part of a locator system. The present invention is particularly, but not exclusively, useful as a device for use in a firefighter locator system that automatically activates a firefighter's signal emitter when the firefighter opens the air tank valve on the firefighter's self-contained breathing apparatus (SCBA).

BACKGROUND OF THE INVENTION

There are many circumstances wherein there is a need to establish the accurate positioning and tracking of movable objects or individuals. This is particularly so when the individual or object is moving in a hostile or dangerous environment. One example is when a firefighter enters a structure during a rescue operation. In situations such as this, there is a need to determine the position of the firefighter from outside the structure with accuracies of approximately one meter. Although an object's position can be determined effectively outdoors using the current global positioning system (GPS), the GPS system is unsuitable, without augmentation, for locating moving objects indoors at accuracies of approximately one meter.

To accurately locate and track objects or individuals inside or adjacent to a structure, the tracking signal that is used by the system must have good penetration and little distortion through the walls and other features of the structures. Lack of-adequate signal penetration can result in a loss of signal strength which in turn can cause unacceptable location errors. Also, the signal should have low deflection (refraction and diffraction) to reduce the presence of multi-path signals which limit location accuracy. Further, to locate an object's position accurately indoors, a system must provide sufficient coverage, and be able to acquire the signals quickly.

Unfortunately, radiofrequency (RF) systems using high frequency signals are limited in their ability to penetrate the walls and features of a structure. Also, because high frequency signals have wavelengths that are much shorter than the size of typical structural features such as rooms, hallways and staircases, these features can act as waveguides for the high frequency waves, altering the path of the signal. On the other hand, low frequency RF signals offer the potential to penetrate the walls and features of a structure and overcome inaccuracies due to fading and path length perturbations caused by diffraction and reflection. Further, since the wavelength of the low frequency waves are approximately the same or greater than the size of typical structural features, the features do not act as waveguides. Consequently, low frequency RF signals having wavelengths approximating the size of structural features are preferred over high frequency signals for use in and around structures.

Traditional positioning technologies use time-of-arrival and the angle-of-arrival methods. In a typical time-of-arrival system, the system measures the time of arrival of a marker modulated onto a signal to determine range. However, in time-of-arrival systems, increased resolution can only be obtained at the expense of increased bandwidth. By way of example, for a desired locating accuracy of one meter, a ranging system based on time of arrival would require a bandwidth on the order of tens of MHz. Unfortunately, this much bandwidth (tens of MHz) is unavailable at the low frequencies required for indoor use.

Another traditional positioning technology is the angle-of-arrival system. Typically, the angle of arrival is measured with array antennas or spinning real-aperture antennas. To achieve an unambiguous angle measurement commensurate with a one meter cross-range resolution at a one kilometer distance, each individual antenna (or array) must be on the order of 15 wavelengths across. Consequently, for the low frequency RF signals required for indoor locating, each antenna would be quite large and costly. Further, such large antennas would be unsuitable for a firefighter locator system which requires small, portable equipment that can be setup quickly.

Another technique for locating the position of an object includes establishing several known locations to receive a signal emitted from the object. By measuring the phase delay of a cyclostationary feature of the signal at each of the known locations, the position of the object can be determined. For example, U.S. Pat. No. 5,999,131 which issued to Sullivan for an invention entitled "Wireless Geolocation System," and which is assigned to the same assignee as the present invention, discloses a system for locating mobile phones within a cell which may comprise several square miles. Unlike a mobile phone system which broadcasts over relatively high frequencies and large distances, the present invention is focused on using low frequency RF signals having the ability to penetrate the walls and floors of structures. Further, whereas it is sufficient to locate a mobile phone within a cell to an accuracy of about 50 feet, the present invention is concerned with locating an object positioned inside a structure to an accuracy of one meter.

During a typical rescue operation, only a portion of firefighters and other emergency personnel that arrive at the scene may actually enter the structure and require locating/tracking. Although it is preferable to supply each firefighter with a signal emitter in case that firefighter is required to enter the structure, it is also preferable to disable each signal emitter until it is needed (i.e. until the corresponding firefighter is required to enter the structure). This reduction in overall signal generation at the site reduces signal clutter and allows for higher system resolution for the activated signal emitters. It is also preferable to have a signal emitter activation system that does not rely on the firefighter to manually activate the signal emitter. It is also desirable to stop the emitter from signal transmission after a firefighter safely exits the structure. Importantly, the mechanism for emitter shutdown should contain safety features to prevent inadvertent emitter shutdown while the firefighter remains in the structure.

Considering the above, it is an object of the present invention to provide a wireless system for locating and tracking the position of a movable signal emitter situated inside a structure with accuracies of approximately one meter. Another object of the present invention is to provide a wireless system for accurately locating the position of a signal emitter that uses penetrating, low frequency RF signals, and requires only a minimal amount of bandwidth.

Still another object of the present invention is to provide a wireless system for accurately locating and tracking the position of a plurality of signal emitters situated inside or adjacent to a structure. It is another object of the present invention to provide a system for automatically activating a firefighter's signal emitter before the firefighter enters a structure. Still another object of the present invention is to provide a system for signal emitter shutdown that contains safety features to prevent inadvertent signal emitter shutdown while the firefighter remains in the structure. Yet another object of the present invention is to provide a wireless locating system that can incorporate a bi-directional data link and is simple to use, and comparatively cost effective.

SUMMARY OF THE PREFERRED EMBODIMENTS

In accordance with the present invention, a system and method for locating and tracking the position of a movable signal emitter that is situated inside a structure includes establishing at least three mutually dispersed base station sites outside the structure at known locations. For a multistory structure, the system preferably includes three base station sites located at approximately ground level, and an additional base station site that is elevated. A central processing site is also included in the system, and a wireless link is provided to allow for communication from each of the base station sites to the central processing site.

To operate the system, the emitter is turned on to transmit a continuous low frequency (approximately 27 Mhz) RF signal. An omni-directional antenna mounted on the emitter allows for the transmission of the signal in all directions. Each base station site has an antenna for receiving the continuous signal. Preferably, each base station site is self-surveying by using either a global positioning system or other wireless method to accurately establish its position. The positions of the base station sites are then communicated to the central processing site for use in the algorithm which computes the position of the emitter.

In one embodiment of the present invention, each base station has access to a reference signal such as a signal that is in phase with the signal generated at the signal emitter. Based on this reference signal, each base station compares the actual signal that is received from the signal emitter to the reference signal in order to measure an actual phase delay at each station. For a given base station, the actual phase delay is indicative of the distance between the signal emitter and the base station. Although indicative of distance, phase-related ambiguities arise in converting the actual phase delay to a distance measurement due to the fact that one actual phase delay could represent more than one possible distance. It is to be appreciated that these possible distances differ by a distance that is related to the signal wavelength.

In this embodiment, the measured actual phase delay from each base station site is communicated to the central processing site. At the central processing site, the measured actual phase delay for a given base station can be converted into a set of possible emitter distances from that base station. This process can be repeated for each base station resulting in a set of possible emitter distances from each base station. Next, the processor can determine all possible points where the distance sets overlap using triangulation methods known in the pertinent art. This set of possible points includes the real emitter position and the ambiguities inherent in the phase-only system.

Next, the ambiguities can be eliminated by the processor to find the real emitter position. It is to be appreciated that the number of ambiguities will depend on the emitter signal wavelength and the coverage area. Several techniques can be used to reduce or eliminate the ambiguities. For example, increasing the number of base stations will generally reduce the number of ambiguities. Another technique involves determining an initial position for the emitter and tracking the movement of the emitter. This technique allows for some of the ambiguous positions to be eliminated as improbable in light of any known limitations on emitter movement such as speed. Another technique involves using an algorithm known in the pertinent art such as the maximum likelihood method (MLM). Another technique for eliminating ambiguities involves using an emitter that transmits multiple frequencies. Here, each frequency produces a set of possible emitter positions. The set of possible positions produced at one frequency can be compared to the set of possible positions produced at a second frequency and any positions that are not common to both sets can be eliminated as ambiguities. Once the ambiguities have been eliminated, the remaining point is the real position of the signal emitter relative to the base station sites.

In another embodiment of the present invention, rather than actual phase delays, relative phase delays from one base station to another can be used to locate the position of a signal emitter. In this embodiment, the location of each base station is known and each base station is synchronized with the other base stations. Synchronization between the emitter and the base stations is not necessary. Each base station measures the phase angle of the emitter signal and records a measurement time. These data are transferred to the central processing site where the processor calculates a set of relative phase delays. Alternatively, the base stations can relay the received signals to the central processing site where the phase angles and measurement times can be determined and used to calculate a set of relative phase delays. For this purpose, the received signal can be time shifted or frequency shifted at the base station and the shifted signal relayed to the central base site thereby reducing signal interference.

For a three receiver system, three relative phase delays can be calculated; a first for base stations one and two, a second for base stations two and three and a third for base stations one and three. Each relative phase delay is indicative of a differential range estimate for the two base stations used to establish the relative phase delay. For example, consider an emitter signal having a wavelength, $\lambda$. Based on a relative phase delay of one-half $\lambda$ measured between base station one and base station two, the processor can establish the set of points wherein the distance from base station one is one-half $\lambda$ greater than the distance from base station two (differential range estimate). Absent any phase-related ambiguities, the emitter must be located at one of these points. Similarly, the processor can establish a differential range estimate for each of the other base station combinations and use the differential range estimates to locate the position of the signal emitter using triangulation algorithms known in the pertinent art. Depending on the signal wavelength and the coverage area, these differential range estimates may contain phase-related ambiguities requiring techniques outlined above such as emitter initialization or using an MLM algorithm to reduce or eliminate the ambiguities.

As contemplated by the present invention, in addition to locating a stationary emitter, the path of a moving signal emitter can be tracked. To track a moving signal emitter, the base stations must be synchronized, and the actual or relative phase delays must be measured simultaneously at predetermined measurement times. This allows the central processing site to calculate an emitter position for each measurement time, and thereby track the position of a moving emitter.

Also in accordance with the method and system of the present invention, a plurality of movable signal emitters can be located and tracked inside and around a structure. Any multiple access protocol known in the pertinent art such as frequency division multiple access (FDMA), code division multiple access (CDMA) or time division multiple access (TDMA) can be used for this purpose. Each base station can include a filter to separate the signals from the plurality of emitters by frequency, code or time. After separation, the actual or relative phase delays for each emitter can be determined for calculation of the location of each emitter relative to the base station sites.

The present invention also includes a system for activating the signal emitter immediately before the firefighter enters the structure. By selectively activating only the signal emitters of those firefighters who are entering the structure, system clutter is reduced. In greater detail, the activating system in accordance with the present invention is used in conjunction with the firefighter's SCBA unit, and causes the signal emitter to begin transmitting a signal when the pressure valve on the SCBA air tank is opened to release tank air to the SCBA facemask. To achieve this functionality, the activation system includes a pressure sensor to monitor pressure on an air line that delivers air from the SCBA air tank to the SCBA air regulator. When tank pressure in sensed in the air line, the emitter is activated by a pressure switch and a signal is transmitted by the emitter for receipt by the base stations to locate/track the signal emitter. The activating system also includes a user operated reset button(s) that is preferably mounted on the signal emitter.

Once activated, the signal emitter continues to transmit a signal until the emitter is instructed to stop transmission. A shutoff circuit is included in the emitter to allow the user to stop transmission of the signal by the signal emitter. As a safety precaution, the shutoff circuit is designed to only stop transmission of the signal if the air line has been depressurized and the reset button(s) is depressed. For these conditions to occur, the user must close the valve on the SCBA air tank, bleed pressure from the SCBA regulator and depress the reset. With this design, the signal emitter continues to transmit a signal after all air from the SCBA air tank is exhausted by the user, as long as the user does not depress the reset button(s). For the present invention, the reset button can be recessed or otherwise protected to avoid inadvertent signal shutoff.

BRIEF DESCRIPTION OF THE DRAWINGS

The novel features of this invention, as well as the invention itself, both as to its structure and its operation, will be best understood from the accompanying drawings, taken in conjunction with the accompanying description, in which similar reference characters refer to similar parts, and in which.

DESCRIPTION OF THE PREFERRED EMBODIMENT

Figure 1:
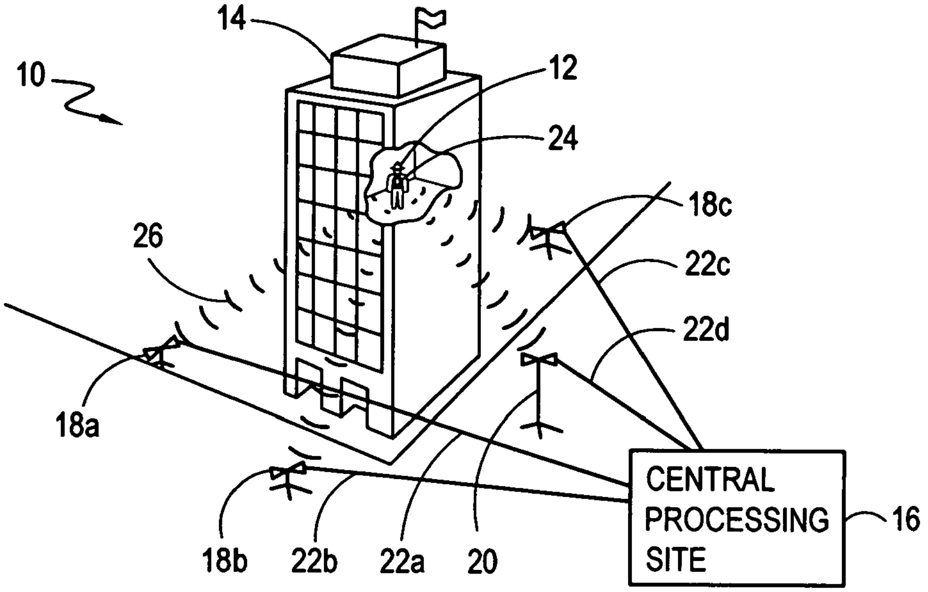
FIG. 1 is a schematic representation of a system of the present invention showing a firefighter equipped with an emitter situated inside a structure, and showing the base station sites and central processing site used to locate and track the position of the firefighter.

Referring initially to FIG. 1, a firefighter locator system in accordance with the present invention is shown and generally designated 10. As shown in FIG. 1, system 10 can be used to determine the position of a firefighter 12 located inside a multistory structure 14. In accordance with the present invention, system 10 preferably includes a central processing site 16, three ground-level base station sites 18 (of which the sites 18*a*, 18*b* and 18*c* are exemplary) and an elevated base station site 20. The base station sites 18*a-c*, and 20 which are shown in FIG. 1 are arbitrarily located and are only representative of base station sites 18, 20 which can be used in system 10 for the present invention. Indeed, it is to be appreciated that the actual positioning of the base station sites 18, 20 is generally unimportant so long as they are mutually dispersed and their exact location is known.

It is contemplated for the present invention that the base station sites 18, 20 will generally be located outside of the structure 14. It is further contemplated for the present invention that at least three base station sites 18, 20 are required to accurately determine the position of a movable object such as a firefighter 12 inside a single-story structure (not shown). For a multi-story structure 14, four or more base station sites 18, 20 are preferred, with at least one elevated base station site 20. FIG. 1 also shows that each base station site 18*a-c*, 20 is in direct communication with the central processing site 16 by a respective communications link 22*a-d*. For purposes of the present invention, the communication links 22*a*, 22*b*, 22*c* and 22*d* are preferably wireless channels, but can be of any type well known in the pertinent art such as a land line.

The basic object of the system 10 is to accurately determine the position of a signal emitter 24 relative to the base station sites 18, 20. Further, this is to be accomplished regardless of whether the signal emitter 24 is stationary or mobile (i.e. being carried by firefighter 12). For the present invention, the signal emitter 24 can be any type of communications equipment which emits omni-directional, electromagnetic radiation signals 26 (e.g. radiofrequency (RF) signals). It is contemplated for the present invention that a low frequency RF signal 26, capable of penetrating the walls and structure of a building is used. Preferably, the signal 26 has a wavelength that is approximately the same or larger size than typical structural features such as hallways, staircases and room dimensions to prohibit these features from acting as a waveguide. For example, a signal 26 with a frequency of approximately 27 Mhz may be used. Also contemplated for the present invention, each signal emitter 24 may have the capability to broadcast both a vertically polarized signal and a horizontally polarized signal. It is to be appreciated that certain horizontally or vertically oriented features of the structure 14 will reflect or diffract signals differently depending on whether the signal is horizontally or vertically polarized. By using both horizontally and vertically polarized signals, position errors due to these oriented features of the structure 14 can be eliminated.

Figure 2:
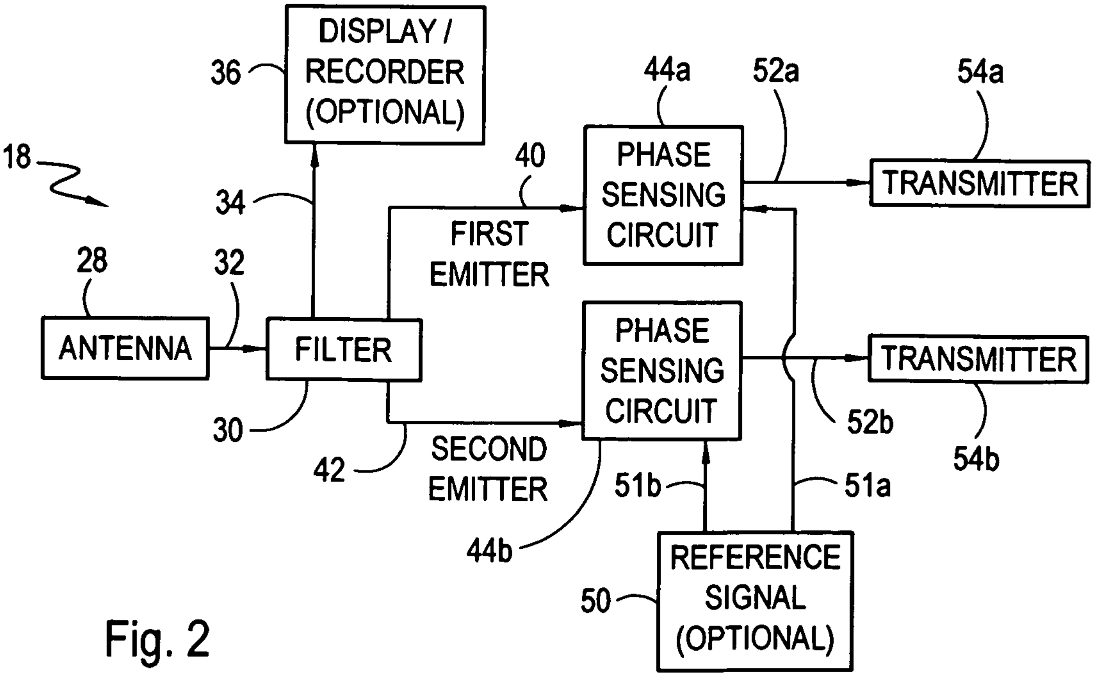
FIG. 2 is a functional block diagram showing the interactive components of a representative base station site for the present invention.

The operation of a representative base station site 18, 20 can be best understood by cross-referencing FIGS. 1 and 2. In FIG. 2, it is to be appreciated that a base station 18, 20 includes an antenna 28 for receiving signals 26 from the signal emitters 24. It is contemplated for the present invention that the system 10 is able to track and locate several signal emitters 24 at once. For example, each signal emitter 24 may broadcast a unique frequency. For the present invention, any multiple access protocol known in the pertinent art such as frequency division multiple access (FDMA), code division multiple access (CDMA) or time division multiple access (TDMA) can be used to allow each base station 18, 20 to process signals 26 from a plurality of signal emitters 24 contemporaneously.

In the preferred embodiment of the present invention, each emitter 24 may include the capability of broadcasting non-position data which can be received by the antenna 28 at each base station site 18, 20. Accordingly, each signal 26 from each emitter 24 may contain both a positioning component and a non-positioning component. Non-position data may include sensor measurements made near the emitter 24 such as oxygen level, carbon monoxide level or temperature. Additionally, firefighter heart rate, air tank level, motion, battery level or similar measurements may be measured by sensors and transmitted to the base station 18, 20.

Once the signals 26 are received at the antenna 28 from each signal emitter 24, the signals 26 and their components must be sorted. FIG. 2 shows that the base station 18, 20 may contain a filter 30 for sorting the received signals 26. As shown in FIG. 2, the signals 26 received at the antenna 28 can be communicated over line 32 to the filter 30 for separation. When a non-position data channel is used, the sorted data can be communicated over line 34 from the filter 30 to a display/recorder 36.

Once separated, the position signals 26 from each signal emitter 24 can be communicated to a phase sensing circuit 44. As shown in FIG. 2, the separated signal 26 from a first emitter 24 can be communicated over line 40 to a phase sensing circuit 44*a*, and the separated signal 26 from a second emitter 24 can be communicated over line 42 to a phase sensing circuit 44*b*.

In one embodiment of the present invention, an actual phase delay ($\tau_A$) for the signal 26 can be determined at the phase sensing circuit 44. In this embodiment, the signal 26 is compared to a reference signal 50 to determine the actual phase delay ($\tau_A$) of each emitter signal 26. As shown in FIG. 2, the reference signal 50 can be communicated over lines 51*a,b* to each phase sensing circuit 44. For this embodiment of the present invention, the reference signal 50 is synchronized with the signal emitter 24. In this embodiment, the actual phase delay ($\tau_A$) determined by each phase sensing circuit 44 is indicative of the distance (range) between the signal emitter 24 and the base station 18, 20 that receives the signal 26. Once determined, the actual phase delay ($\tau_A$) for each signal 26 received at a base station 18, 20 can be communicated from each phase sensing circuit 44 over a line 52*a,b* to a transmitter 54*a,b*. The transmitter 54*a,b* allows the actual phase delay ($\tau_A$) data to be sent from the base station site 18, 20 to the central processing site 16 over the communication link 22. As described in detail below, the central processing site 16 processes the actual phase delays ($\tau_A$) from each base station site 18, 20 to geometrically determine the position of each signal emitter 24 relative to the base station sites 18, 20.

In another embodiment, position information can be obtained without synchronizing the reference signal 50 at each base station site 18, 20 with the signal emitter 24. Rather than measuring actual phase delays at each base station 18, 20, a relative phase delay ($\tau_R$) can be determined by comparing the signal 26 received at one base station site 18, 20 with the signal 26 received at a second base station site 18, 20. By comparing each base station 18, 20 to at least one other base station 18, 20, a set of relative phase delays ($\tau_R$) can be obtained and used to find the location of the signal emitter 24. In this embodiment, each base station 18, 20 has a reference signal 50 that is synchronized with the reference signal 50 at each of the other base stations 18, 20. The phase sensing circuit 44 measures the phase of the signal 26 and the reference signal 50 is used to obtain a measurement time. Once determined, the phase and measurement time for each signal 26 received at a base station 18, 20 can be communicated from each phase sensing circuit 44 over a line 52*a,b* to a transmitter 54*a,b*. The transmitter 54*a,b* allows the phase and measurement time to be sent from the base station site 18, 20 to the central processing site 16 over the communication link 22.

At the central processing site 16, a relative phase delay ($\tau_R$) can be calculated by comparing the phase and time measurement data received from one base station site 18, 20 with the phase and time measurement data received from a second base station site 18, 20. In this embodiment, each relative phase delay ($\tau_R$) determined at the central processing site 16 is indicative of the differential range between the signal emitter 24 and the two base stations 18, 20 used to calculate the relative phase delay ($\tau_R$). Stated differently, each relative phase delay ($\tau_R$) indicates that the signal emitter 24 may be further from one base station 18, 20 than another base station 18, 20, and indicates the magnitude of this difference. By comparing each base station 18, 20 to at least one other base station 18, 20, a set of relative phase delays ($\tau_R$) can be obtained. As described in detail below, this set of relative phase delays ($\tau_R$) can be used to geometrically determine the position of each signal emitter 24 relative to the base station sites 18, 20.

In yet another embodiment, each base station 18, 20 can relay the received signals 26 to the central processing site 16 for calculation of either actual or relative phase delays ($\tau$). Since the distance between each base station 18, 20 and the central processing site 16 is known, the phase delay due to the signal travel between the base station 18, 20 and the central processing site 16 can be eliminated using processing techniques known in the pertinent art. At the central processing site 16, the relayed signals can be compared directly to calculate a set of relative phase delays ($\tau_R$) or the central processing site 16 can include a reference signal in phase with the signal emitter 24 to allow calculation of actual phase delays ($\tau_A$). For this purpose, the received signal 26 can be time shifted or frequency shifted at the base station 18, 20 and the shifted signal relayed to the central processing site 16 thereby reducing signal interference.

Figure 3:
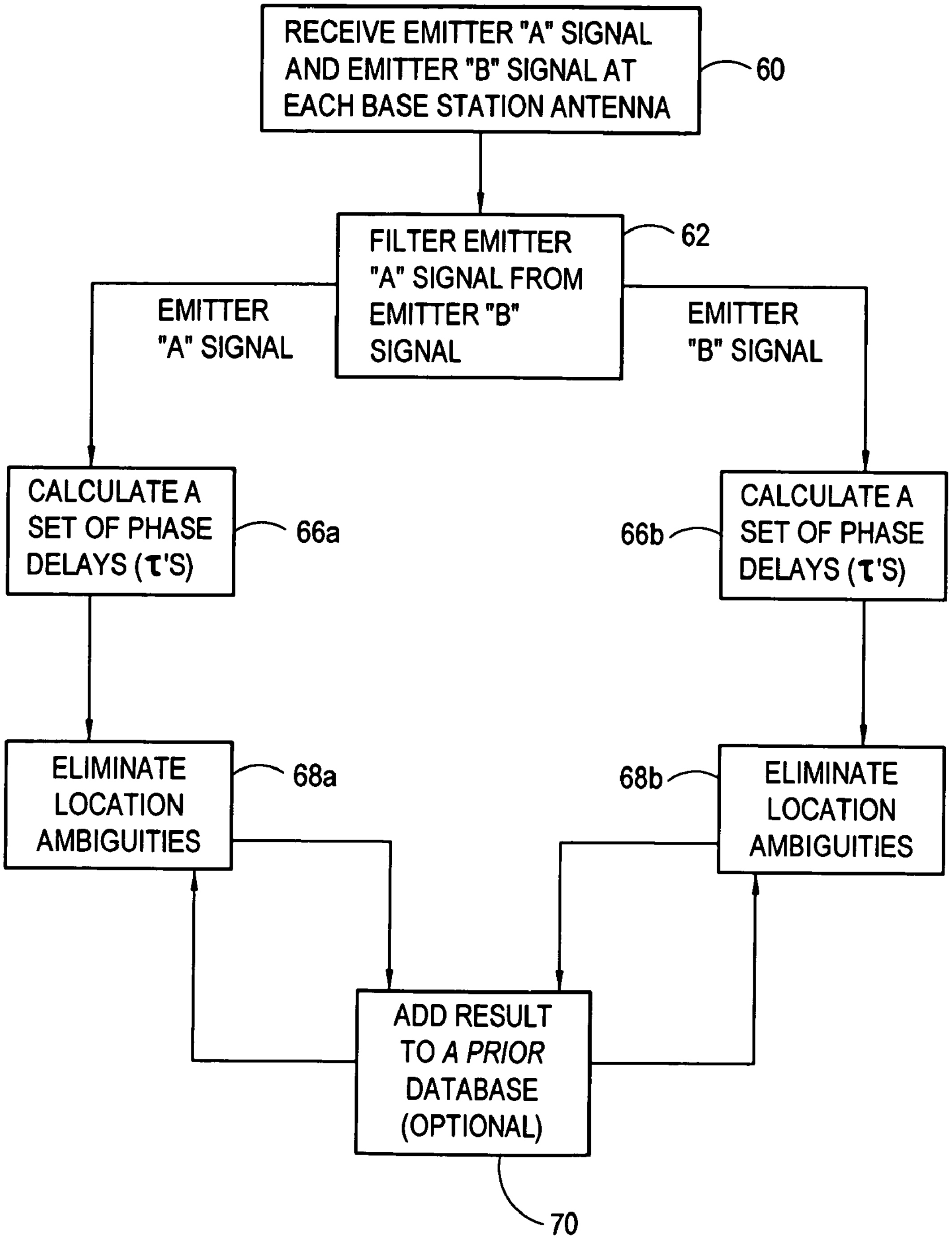
FIG. 3 is a functional block diagram setting forth the sequential steps performed during operation of the system of the present invention.

The operation of system 10 of the present invention will, perhaps, be best understood by cross-referencing FIGS. 2 and 3. Block 60 indicates that the antenna 28 at each base station site 18, 20 receives the low frequency signals 26 from the signal emitters 24 (e.g. emitter "A" and emitter "B"). Next, as indicated by block 62, the signals 26 from the signal emitters 24 are separated using a filter 30. As shown in blocks 66*a,b*, once separated, the signals 26 can be used to calculate either actual or relative phase delays ($\tau$). As indicated above, if actual phase delays ($\tau_A$) are used, they can be calculated at either the base station 18, 20 or the central processing site 16. If relative phase delays ($\tau_R$) are used, they are calculated at the central processing site 16. At the central processing site 16, each calculated phase delay ($\tau$) is converted into a set of possible locations where the signal emitter 24 may be. If actual phase delays ($\tau_A$) are used, each actual phase delay ($\tau_A$) is converted into a set of possible locations that indicate distance from the corresponding base station 18, 20. If relative phase delays ($\tau_R$) are used, each relative phase delay ($\tau_R$) is converted into a set of possible locations that indicate a differential range for the corresponding base stations 18, 20 used to determine the relative phase delay ($\tau_R$).

In either case, the conversion of phase delays to distance measurements results in phase-related ambiguities that increase the number of possible locations represented by each phase delay. Specifically, each actual phase delay ($\tau_A$) represents a plurality of ranges from the base station 18, 20. It is to be appreciated that these ranges differ by a distance related to the wavelength of the signal 26. Similarly, each relative phase delay ($\tau_R$) represents a plurality of differential ranges for the base stations 18, 20 used to calculate the relative phase delay ($\tau_R$). It is to be appreciated that the distances between these differential ranges are related to the wavelength of the signal 26.

Once each phase delay ($\tau$) is converted into a set of possible locations for the signal emitter 24, the processor can determine all possible points where the distance sets overlap using triangulation methods known in the pertinent art. This set of possible points includes the real position of the signal emitter 24 and the ambiguities inherent in the phase-only system.

Next, as shown in blocks 68*a,b*, the ambiguities can be eliminated by the processor to find the real position of the signal emitter 24. It is to be appreciated that the number of ambiguities will depend on the wavelength of the signal 26 and the size of the area in which the signal emitter 24 may be found. Several techniques can be used to reduce or eliminate the ambiguities. For example, increasing the number of base stations 18, 20 will generally reduce the number of ambiguities. Another technique involves determining an initial position for the signal emitter 24 and tracking the movement of the signal emitter 24. This technique allows for some of the ambiguous positions to be eliminated as improbable in light of any known limitations on signal emitter 24 mobility. Block 70 shows that an a prior database can be used to record the result of each position determination for use in a subsequent position determination. Another technique to reduce or eliminate phase-related ambiguities involves using an algorithm known in the pertinent art such as the maximum likelihood method (MLM). Another technique for eliminating ambiguities involves using a signal emitter 24 that transmits two or more signals 26 contemporaneously, each signal 26 having a different frequency. Since each frequency produces a different set of possible positions for the signal emitter 24, the set of possible positions produced at one frequency can be compared to the set of possible positions produced at a second frequency and any positions that are not common to both sets can be eliminated as ambiguities. Additionally, a combination of the above techniques can be used to eliminate phase-related ambiguities. Once the ambiguities have been eliminated, the remaining point is the real position of the signal emitter 24 relative to the base station sites 18, 20.

Figure 4:
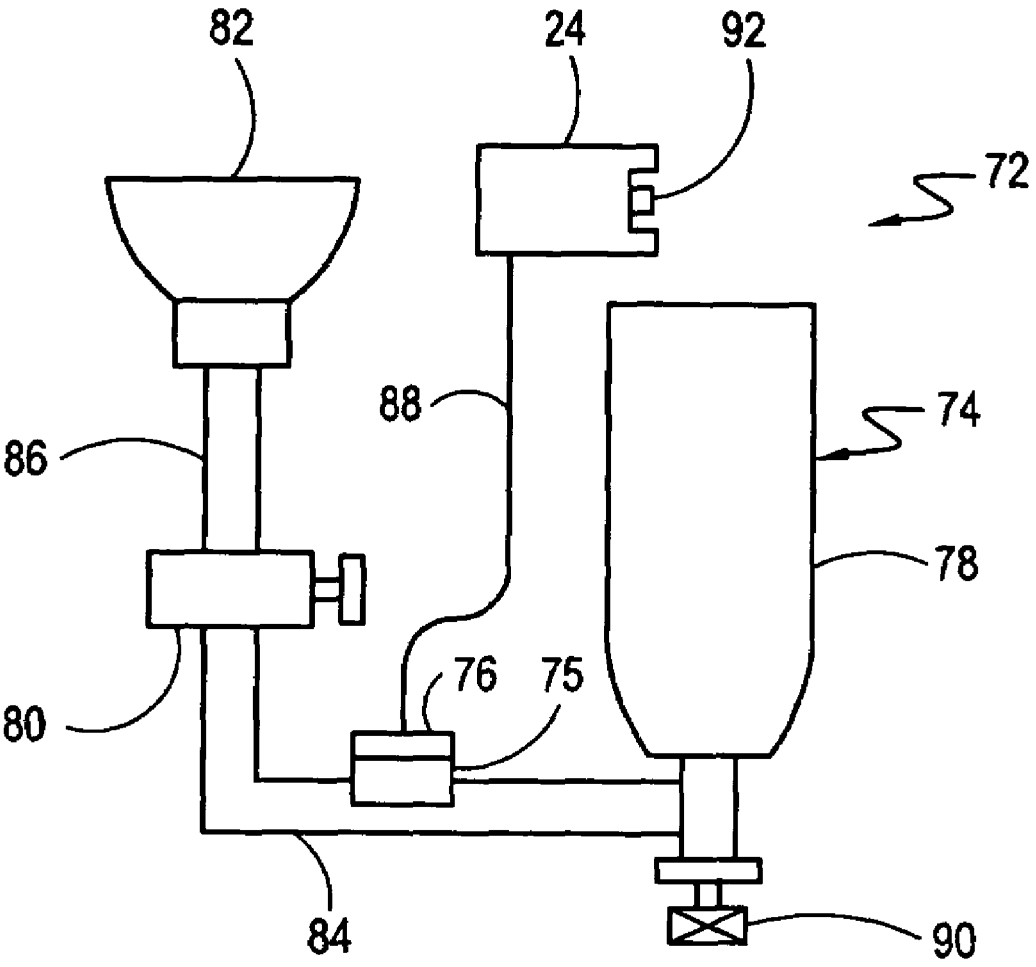
FIG. 4 is a schematic representation of a system for emitter activation in accordance with the present invention.

Referring now to FIG. 4, it can be seen that the present invention also includes a system 72 for activating the signal emitter 24 immediately before the firefighter enters the structure. By selectively activating only the signal emitters 24 of those firefighters who are entering the structure, signal clutter is reduced. As shown, the activating system 72 includes a firefighter's SCBA 74, a pressure sensor 75, a pressure switch 76, and the signal emitter 24. The firefighter's SCBA 74 includes an SCBA air tank 78, a pressure regulator 80 and a facemask 82. The firefighter's SCBA 74 further includes an air line 84 for delivering air from the SCBA air tank 78 to the SCBA pressure regulator 80, and an air line 86 for delivering air from the SCBA pressure regulator 80 to the facemask 82.

As further shown in FIG. 4, the pressure sensor 75 monitors pressure on air line 84. When tank pressure is sensed in air line 84, the emitter 24 is activated by the pressure switch 76 (via wire 88) and a signal is transmitted by the emitter 24. Also shown, the SCBA air tank 78 has a pressure valve 90 that can be opened to release tank air to the regulator 80 and facemask 82. It is to be appreciated that with this combination of structure, the pressure sensor 75 senses tank pressure in air line 84 and the pressure switch 76 activates emitter 24 when valve 90 is opened.

The activating system 72 also includes a user operated reset button 92 that is preferably mounted on or is integral with the signal emitter 24. A shutoff circuit is included in the emitter 24 to allow the user to stop transmission of the signal by the signal emitter 24. Once activated, the signal emitter 24 continues to transmit a signal until the emitter 24 is instructed to stop transmission. As a safety precaution, the shutoff circuit is designed to only stop transmission of the signal if the air line 84 has been depressurized and the reset button 92 is depressed. For these conditions to occur, the user must close the valve 90 on the SCBA air tank 78, bleed pressure from the SCBA regulator 80 and depress the reset button 92. As shown, the reset button 92 can be recessed to avoid inadvertent signal shutoff. Alternatively, a pair of reset buttons 92 (pair not shown) that must be simultaneously depressed to cause shutoff can be implemented in accordance with the present invention to avoid inadvertent signal shutoff. With the shutoff circuit configured in this manner, the signal emitter 24 continues to transmit a signal after all the air from the SCBA air tank 78 is exhausted by the user, as long as the user does not depress the reset button 92.

While the particular firefighter locator with activator as herein shown and disclosed in detail is fully capable of obtaining the objects and providing the advantages herein before stated, it is to be understood that it is merely illustrative of the presently preferred embodiments of the invention and that no limitations are intended to the details of construction or design herein shown other than as described in the appended claims.

What is claimed is:

1. A locator system comprising:

a self-contained breathing apparatus having an air tank, a regulator, and an air line for delivering air from an air tank valve to said regulator;

a pressure sensor for monitoring a pressure at a location in the air line between the air tank and the regulator within said self-contained breathing apparatus;

a signal emitter; and a switching means mounted to said pressure sensor and responsive to said pressure sensor to activate the signal emitter when said pressure rises above a predetermined value at the monitored location in the air line between the air tank and the regulator.

2. An activation device as recited in claim 1 wherein the monitoring location is downstream from the air tank valve.

3. An activation device as recited in claim 1 wherein the air tank has an air tank valve, and wherein the air line delivers air from the air tank valve to the regulator.

4. An activation device as recited in claim 3 wherein said switching means is configured to activate the signal emitter when the air tank valve is opened.

5. An activation device as recited in claim 1 further comprising a reset button to deactivate the signal emitter when said reset button is depressed and the pressure at the monitored location is less than the predetermined value.

6. A system for providing air to a user and activating a signal emitter for use in locating the user, said system comprising:

an air tank having an air tank valve;

a regulator for regulating air pressure from said air tank;

an air line for delivering air from said air tank valve to said regulator;

a facemask for delivering air to the user from said regulator;

a pressure sensor coupled with said air line to monitor a pressure within said air line between said air tank valve and said regulator; and a switching means responsive to said pressure sensor to activate the signal emitter when said pressure rises above a predetermined value at the monitored location.

7. A system as recited in claim 6 wherein said switching means is configured to activate the signal emitter when said air tank valve is opened.

8. A system as recited in claim 6 further comprising a reset button to deactivate the signal emitter when said reset button is depressed and the pressure at the monitored location is less than the predetermined value.

9. A wireless locator system for a self-contained breathing apparatus comprising:

a signal emitter for emitting a low frequency signal;

an air tank having an air tank valve;

a regulator for regulating air pressure from said air tank;

an air line for delivering air from said air tank valve to said regulator;

a pressure sensor for monitoring a pressure at a location in the air line between the air tank valve and the regulator;

a switching means responsive to said pressure sensor to activate said signal emitter when said pressure rises above a predetermined value at the monitored location;

at least three mutually dispersed base station sites for receiving said low frequency signal from said signal emitter at each base station site;

at least one phase sensing circuit for determining phase information for each received signal; and a central processing site connected in communication with each said base station site, said central processing site having a processor for using said phase information to determine the position of said signal emitter relative to each said base station site.

10. A locator system as recited in claim 9 further comprising a reset button to deactivate the signal emitter when said reset button is depressed and the pressure at the monitored location is less than the predetermined value.

11. A locator system as recited in claim 9 wherein said switching means is configured to activate said signal emitter when the air tank valve is opened.

12. A locator system as recited in claim 11 wherein a said phase sensing circuit is located at each said base station site, and wherein each said base station site further comprises a reference signal synchronized with said signal emitter and in communication with said phase sensing circuit, and wherein said phase information is an actual phase delay.

13. A locator system as recited in claim 11 wherein said at least one phase sensing circuit is a phase sensing circuit located at said central processing site, and wherein said central processing site further comprises a reference signal synchronized with said signal emitter and in communication with said phase sensing circuit, and wherein each said base station site has a transmitter for relaying said received signal to said central processing site, and wherein said phase information is an actual phase delay.

14. A locator system as recited in claim 11 wherein said at least one phase sensing circuit is a phase sensing circuit located at each said base station site, and wherein each said base station site further comprises a reference signal for synchronizing said base stations, and wherein said phase information is a phase measurement and a measurement time.

15. A locator system as recited in claim 11 wherein said processor uses said phase information to calculate at least one relative phase delay to determine the location of said signal emitter relative to each said base station site.

16. A locator system as recited in claim 11 wherein said at least one phase sensing circuit is a phase sensing circuit located at said central processing site, and wherein each said base station site has a transmitter for relaying said received signal to said central processing site, and wherein said phase information is a relative phase delay.

17. A locator system as recited in claim 11 wherein said three mutually dispersed base station sites lie substantially in a common plane, and further comprising a fourth base station site, said fourth base station site lying substantially outside of said common plane.

18. A locator system as recited in claim 11 wherein each said base station site further comprises:

a means for self-surveying; and a means for communicating the position of each base station to said central processing site.

* * * * *